(12) United States Patent
Haj-Hariri et al.

(10) Patent No.: US 11,357,211 B2
(45) Date of Patent: Jun. 14, 2022

(54) SYSTEM FOR MONITORING AND MAINTAINING SEPARATION

(71) Applicant: University of South Carolina, Columbia, SC (US)

(72) Inventors: Hossein Haj-Hariri, Columbia, SC (US); Gavin Thomas Garner, Charlottesville, VA (US); Mitra Minter Haj-Hariri, Columbia, SC (US); Dara Davisson Haj-Hariri, Columbia, SC (US)

(73) Assignee: Universtiy of South Carolina, Columbia, SC (US)

( * ) Notice: Subject to any disclaimer, the term of this patent is extended or adjusted under 35 U.S.C. 154(b) by 0 days.

(21) Appl. No.: 17/124,620

(22) Filed: Dec. 17, 2020

(65) Prior Publication Data

US 2021/0176959 A1    Jun. 17, 2021

Related U.S. Application Data

(60) Provisional application No. 62/948,865, filed on Dec. 17, 2019.

(51) Int. Cl.
| | | |
|---|---|---|
| *G08B 29/18* | (2006.01) | |
| *A01K 11/00* | (2006.01) | |
| *A01K 29/00* | (2006.01) | |
| *G08B 21/18* | (2006.01) | |

(52) U.S. Cl.
CPC .......... *A01K 11/006* (2013.01); *A01K 29/005* (2013.01); *G08B 21/182* (2013.01); *G08B 29/185* (2013.01)

(58) Field of Classification Search
CPC .. A01K 11/006; A01K 29/005; G08B 21/182; G08B 29/185; G08B 21/0266; G08B 21/22
See application file for complete search history.

(56) References Cited

U.S. PATENT DOCUMENTS

| | | | |
|---|---|---|---|
| 8,115,642 B2 | 2/2012 | Thompson | |
| 2008/0018472 A1* | 1/2008 | Dasilva ................. | F16P 3/147 340/572.4 |
| 2010/0139576 A1 | 6/2010 | Kim et al. | |
| 2013/0157628 A1 | 6/2013 | Kim et al. | |
| 2014/0253292 A1* | 9/2014 | Ahler .................... | G01S 5/0045 340/10.1 |
| 2014/0352632 A1* | 12/2014 | McLaughlin .......... | A01K 11/00 119/721 |
| 2018/0122218 A1* | 5/2018 | Shanley ................. | F16P 3/147 |

FOREIGN PATENT DOCUMENTS

WO    PCTUS1996017473    7/1997

* cited by examiner

*Primary Examiner* — Hongmin Fan
(74) *Attorney, Agent, or Firm* — Burr & Forman LLP; Douglas L. Lineberry (57) ABSTRACT

A system for maintaining inter-object separation between different objects such as animals, machinery, or people, that uses distance signaling to provide and maintain separation via correction activities that may also be used to keep the first two objects at a prescribed distance from a third object.

18 Claims, 5 Drawing Sheets

SYSTEM FOR MONITORING AND MAINTAINING SEPARATION

TECHNICAL FIELD

The present invention relates to a system for maintaining separation and location between different objects, animals or people.

BACKGROUND

Prior art systems for establishing and maintaining a boundary are known. For example, U.S. Pat. Pub. 2010/0139576 (Kim '576) discloses an electronic fence system capable of guiding animals under training to return to a predetermined restricted area. The fence system may utilize either a plurality of loops to determine direction of travel for a receiver unit or, alternatively, a GPS system. For embodiments utilizing the GPS system, electronic fences are defined in relation to GPS location information. A lockdown mode is used to contain an animal to a very constricted area when a control command is received to initialize the lock down mode or upon a specified condition. Specified conditions include the animal approaching or entering a specified area or, alternatively, a threshold level of charge being reached for a battery that provides power for the receiver unit. (Abstract.)

U.S. Pat. Pub. No. 2013/0157628 (Kim '628) discloses an electronic fence system capable of guiding animals under training to return to a predetermined restricted area wherein a smart phone is communicatively coupled to a controller or interface device which, in turn, is communicatively coupled to a trainer/receiver. (Abstract.)

U.S. Pat. No. 8,115,642 (Thompson '642) discloses a method and apparatus that combines GPS, map overlays, a means to draw containment perimeters directly over map overlays, and a means to transmit signals to any plurality of electronic stimulus control collars to contain humans or animals within each containment perimeter. This provides hunters with a means to effortlessly operate functions of an animal stimulus collar while hunting. Novel features include a means to specify a containment perimeter that travels with the hunter by drawing the same on a on a touch sensitive graphic user interface that displays a map of the local area. This invention is easy to use and readily accepts new perimeters, perimeter alterations, or a multiple of perimeters at will. (Abstract.)

PCT/US 1996/017473 (Schlager '473) discloses a system that includes a supervising base station and remote monitoring unit(s) including a navigational receiver providing a remote unit location and a transmitter for communicating the location to the base station for display. The remote unit includes sensor(s) monitoring the remote location. A change in sensor status results in the status and the location being transmitted to the base station, which includes alarms and displays responsive to the change in status. Various embodiments define a man-over-board system, an invisible fence system, and a weather surveillance system. (Abstract.)

Indeed, mechanized industrial settings use variations of protective boundaries. For instance, Nephron pharmaceuticals in Columbia, S.C., has a highly mechanized manufacturing floor. At one point, automated forklifts take pallets of vaccines or saline down a long passage to the loading dock. Visitors/works are told not to get in front of the forklift. However, if one were to do so, there are cameras fixed along the hallway that detect the visitor/worker and stop the forklift. While a "corrective action" is taken because of a person walking in front of the forklift, this occurs due to the cameras and a "smart brain" in the control loop, not due to the actual proximity of the visitor/worker to the forklift and vice versa. In contrast, the current disclosure is more of a local solution that is capable of operating in any and multiple dimensions (more than the 1-dimension of a long passage way), and makes a decision "on the fly" based on the level of proximity of two or more objects.

However, what is needed in the art is not simply a way to locate, restrain, or restrict an object, such as an animal, forklift, person, etc., within a certain location but, instead, to prevent or warn the object from entering a predefined territory or to maintain inter-object separation. Accordingly, it is an object of the present invention to provide a dynamic zoning solution that takes into account varying interactions between objects in order to maintain inter-object separation.

Citation or identification of any document in this application is not an admission that such a document is available as prior art to the present disclosure.

SUMMARY

The above objectives are accomplished according to the present disclosure by providing in a first embodiment, a system for maintaining interobject separation. The system may include at least one first proximity device affixed to a first object, with the first proximity device including a transmitter/receiver, at least one second proximity device affixed to a second object, with the second proximity device having a transmitter/receiver, the first proximity device receiving at least one signal transmitted from the at least one second proximity device, the signal may vary in intensity based on a distance between the first object and second object, and the signal triggers a corrective measure when the first object and second object are within a predefined distance from one another. Further, the signal may have a protocol to eliminate false positive triggers. Still, the first object and the second object may be capable of movement independent of one another. Still again, the first and second object may be animals. Yet further, the first and second transmitter may emit at least one continuous signal to the first and second receiver. Still further, the first and second transmitter may send separate signals to the first and second receiver wherein each signal is distance encoded. Yet more, additional corrective measures may be employed as the time the first object and second object are in the predefined distance from one another increases. Yet again, multiple corrective measures may be applied simultaneously once a determined time threshold is reached. Still more, at least one additional signal may be employed to keep either the first or second object within a set distance of a third object. Further again, either the first or second object, but not both, may receive the corrective action when the first and second object come within the predefined distance from one another.

In a further embodiment, a method for maintaining interobject separation is provided. The method may include affixing at least one first proximity device to a first object, wherein the first proximity device includes a transmitter/receiver, affixing at least one second proximity device to a second object, the second proximity device may include a second transmitter/receiver, configuring the at least one first proximity device to receive at least one signal transmitted from the at least one second proximity device, varying intensity of the at least one signal based on a distance between the first object and second object, and triggering, via the at least one signal, at least one corrective measure when the first object and second object are within a predefined distance from one another. Still further, the signal may be a protocol to eliminate false positive triggers. Yet still, the first object and the second object may be capable of movement independent of one another. Moreover, the first and second object may be animals. Again still, emitting via the first and second transmitter at least one continuous signal that is received by the first and second receiver Further, each signal may be distance encoded. Still more, the method may include employing additional corrective measures as time the first object and second object are in the predefined distance from one another increases. Further, multiple corrective measures may be simultaneously applied once a determined time threshold is reached. Indeed, at least one additional signal may be used to keep either the first or second object within a set distance of a third object. Yet still, the first or second object, but not both, may receive the corrective action when the first and second object come within the predefined distance from one another.

These and other aspects, objects, features, and advantages of the example embodiments will become apparent to those having ordinary skill in the art upon consideration of the following detailed description of example embodiments.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further embodiment includes from the one particular value and/or to the other particular value. The recitation of numerical ranges by endpoints includes all numbers and fractions subsumed within the respective ranges, as well as the recited endpoints. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the singular forms "a", "an", and "the" include both singular and plural referents unless the context clearly dictates otherwise.

As used herein, "about," "approximately," "substantially," and the like, when used in connection with a measurable variable such as a parameter, an amount, a temporal duration, and the like, are meant to encompass variations of and from the specified value including those within experimental error (which can be determined by e.g. given data set, art accepted standard, and/or with e.g. a given confidence interval (e.g. 90%, 95%, or more confidence interval from the mean), such as variations of +/−10% or less, +/−5% or less, +/−1% or less, and +/−0.1% or less of and from the specified value, insofar such variations are appropriate to perform in the disclosure. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment", "an embodiment," "an example embodiment," means that a particular feature, structure or characteristic described in connection with the embodiment is included in at least one embodiment of the present disclosure. Thus, appearances of the phrases "in one embodiment," "in an embodiment," or "an example embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure. For example, in the appended claims, any of the claimed embodiments can be used in any combination.

All patents, patent applications, published applications, and publications, databases, websites and other published materials cited herein are hereby incorporated by reference to the same extent as though each individual publication, published patent document, or patent application was specifically and individually indicated as being incorporated by reference.

In one embodiment the current disclosure relates to improved inter-object dynamics. For instance, the current state of the art for fencing-in pets electronically is to have a stationary, powered transmission source (either a continuous wire, or a stand-alone charged or wired pod), and a receiver collar on the pet. This solution works well to keep pets in a desired zone. However, within that zone, different pets could still interact with each other in ways that could be harmful or unpleasant.

The current disclosure discloses a new paradigm, wherein the protected pet will wear a collar (or otherwise carry a device) with a transmitter, and the more aggressive pet will wear a collar with the receiver. The transmitter could be always on (if the carrying pet is large enough to be able to carry the weight of the fully charged or batteries transmitter), or it could activate in response to the proximity of the aggressive pet, using RFID or other technologies. For example, a dog wearing a long-distance RFID reader on its larger collar could detect a cat wearing a passive RFID chip (that does not consume power, i.e., does not require heavy batteries). Once the dog's collar detects the cat's RFID chip, it can send a "wakeup" signal to the cat's collar that activates the cat collar's variable-power distance encoded signal transmission for a certain amount of time. The outcome of this disclosure is that the static zoning of today's state of the art will be replaced by the dynamic zoning of the proposed solution, wherein the protected pet will always be at the center of a zone of protection which is dynamically attached to the more aggressive pet.

Analogies of the present disclosure are applicable to a vast foray of industries. For instance, in a commercial warehouse setting, the system of the current disclosure may be employed to maintain minimum safe distances between vehicles hauling materials. At airports, the system may be put in place to maintain distances between aircraft and service vehicles. Thus, the utility of the current disclosure may be employed across various implementations. For example, the system could be: (1) placed on a trash can that is occasionally moved curbside; (2) after proper certification, the invention could even be placed on humans: useful applications may include prisons, schoolyards (e.g., to keep bullies away from victims), people with restraining orders, etc.; and (3) swarms of autonomous robots. Further, the "corrections" to enforce the object separation do not have to be delivered through electric shock, as in the case of an animal training collar, but instead could be unpleasant noises, monetary fines accrued based on time spent within certain distances, vibration, text alerts, etc. This type of negative reinforcement would help keep both sentient, semi-sentient, and nonsentient entities from coming into undesired contact with one another.

Figure 1:
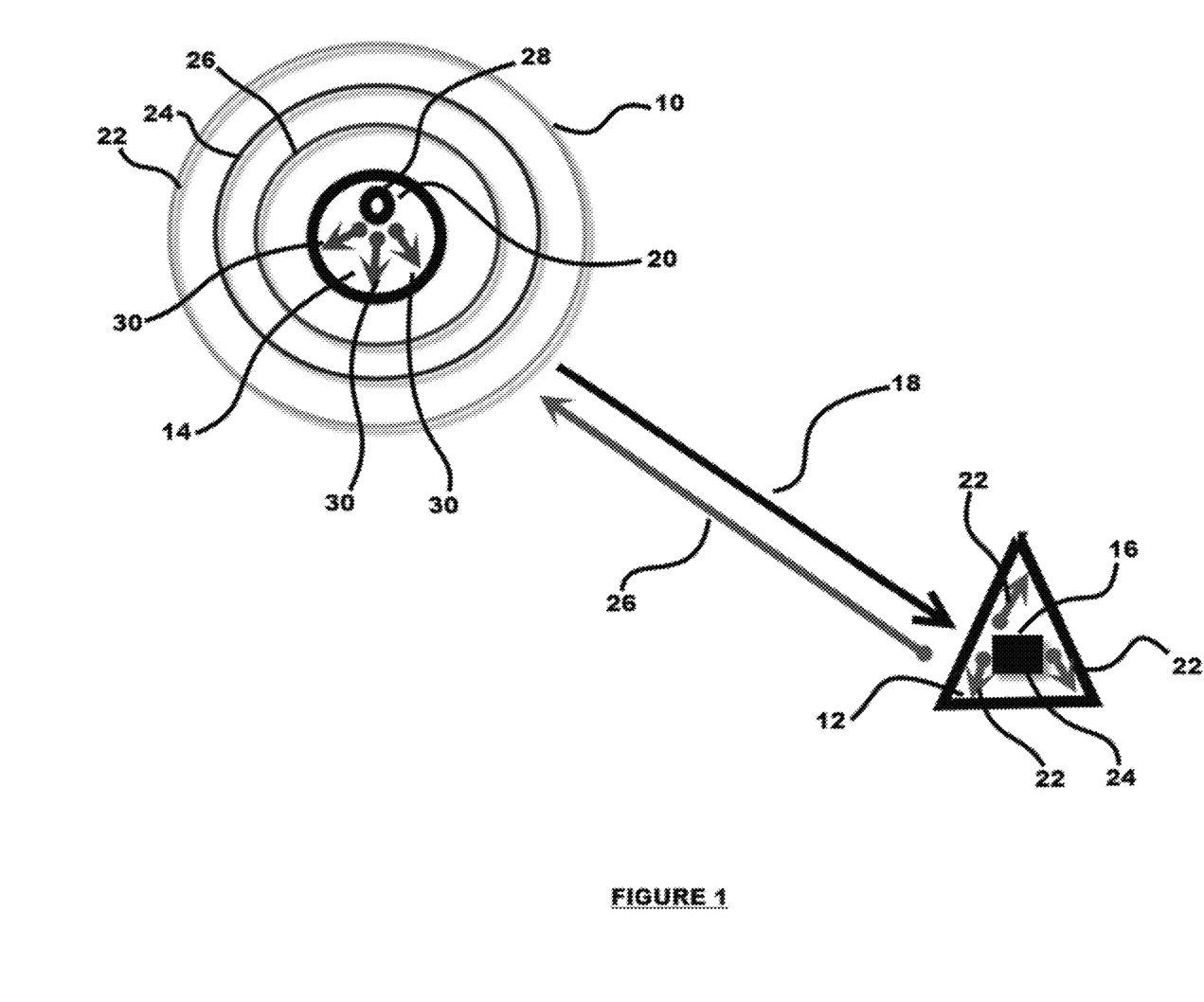
FIG. 1 shows a multi-stage, movable wireless proximity barrier of the current disclosure.

In one embodiment, as shown by FIG. 1, the current disclosure establishes a multi-stage, movable wireless proximity barrier 10 that can be used to keep a first object 12, such as an animal, from getting too close to a second object 14, such as another animal or other moving or movable object. Expanding on and improving upon prior art related to stationary pet barriers, which consist of either an "invisible fence" enclosure created by a loop of wire or a fixed, stationary indoor transmitter, the current disclosure allows wireless barrier 10 to be moved around by first object 12, which needs to be protected from contact with the second object 14, such as a bothersome animal. The first object 12, that needs to be protected (e.g., a cat, forklift, person, etc.) wears a receiver device 16 (e.g. on a collar) that receives a wireless signal 18 (e.g., a radio frequency in the form of amplitude modulation or frequency modulation or timed digital pulses on a carrier frequency or a WiFi, WiMAX, Satellite, Bluetooth, Zigbee, Microwave, Infrared, or other signal system as known to those of skill in the art) following a specific type of protocol/encoding (which helps to eliminate the possibility of false triggers from similar signals created by nature and other sources that may be present in the environment) from a transmitter 20 located on second object 14. Possible receivers of the current disclosure include wideband crystal, RF crystal, Superhet (narrow or wide band), channelized, microscan, acousto-optic, etc., as known to those of skill in the art. Transmitters may include analog, digital, multivariable, microprocessor based, intelligent, smart, fieldbus, etc., that may employ communication platforms such as HART and/or FOUNDATION. Furthermore, since the amount of information required to encode distance information needs very little bandwidth, frequencies that fall below regulated ranges may be able to be used without requiring any special approval or licensure. Amplitude modulation (AM) would be the simplest form of transmitter/receiver. In the US, the FCC limits frequency bands that are available for general public use. As such, most of the common protocols (e.g. WiFi, Bluetooth, Zigbee) are optimized to work within certain frequency ranges. Since our system does not need to transmit much data and this data does not need to be transmitted very quickly (i.e., over milliseconds not nanoseconds), it should even be able to operate at low frequencies that fall outside of the FCC's regulation. Adding any sort of digital data component to the signal would allow for simple encoding (e.g. a header/ID byte) to help prevent false positives or to allow multiple pets to operate within the system, each with different boundaries/rules.

Following the inverse square law, the intensity of wireless signal 18 picked up by receiver 16 is reduced the further away receiver 16 is from transmitter 20. Receiver 16 in this system can be tuned to only respond to signals, such as signals 22, 24, and 26, which emanate from receiver 20, that it receives above a certain threshold intensity correlating to receiver 16 being within a specific distance from transmitter 20. Furthermore, the transmitter can output multiple different signals at different power intensities (i.e., that travel different distances) sequentially so that receiver 16 can know approximately how far it is from transmitter 20 based on which of the distance-encoded signals, 22, 24, and 26 it can actually pick up clearly. Such distance encoding can be realized by varying the power/intensity of the signal (by adjusting the electrical power used in its generation or by routing the signal through different length antennae within the transmitter), in order to adjust the distance that it can travel. Information can also be added to these variable power signals in the form digital data or frequency modulated signals that allows the receiver to distinguish between these signals that were sent at different power levels. Thus, object 12 that needs to be kept away from object 14, which may be a movable object, wears receiver 16, which, when it detects that it is too close to transmitter 20 on object 14, responds with a corrective measure (sound, electric shock, vibration, etc.). In the instance of animal training, an animal wearing receiver 16 will soon learn to avoid object 16, which has transmitter 20. Furthermore, since the approximate distance from transmitter 20 can be determined, receiver 16 may scale the amount of correction 22 based on the proximity of receiver 16 to transmitter 20. For example, receiver 16 could emit a warning sound when the animal approaches within a predetermine distance, for purposes of example only, 5 feet of transmitter 20, but the which changes to a slight shock when the animal gets within 4 feet, which increases to a stern shock when the animal gets within 3 feet.

Transmitter 20 device will consume more power than receiver 16 and will therefore require a greater power source, e.g., larger batteries, with more capacity than receiver 16 in order to last for the same amount of time. In a further embodiment, it would be preferable to have a smaller device on the movable item that is being protected, here object 12. For example, if one was to put a transmitter 20, which also includes a second receiver 28, on a large dog to keep it away from a small cat. In this case, transmitter 20 (which could be a continuous transmitter emitting one signal every second) could be placed on the dog (which could tolerate the extra weight of the larger power supply) and the smaller receiver 16 could be placed on the cat. However, in this embodiment, the cat's receiver 16 would also have a second transmitter 24 and would transmit a return signal 26 back to the dog's transmitter 20/receiver 28, if and only if it received a proximity alert from the dog's transmitter 20. Return signal 26 from the cat's second transmitter 24 would then trigger a second correction 30, such as a warning or shock response, in the dog's transmitter 20/receiver 28.

Figure 2:
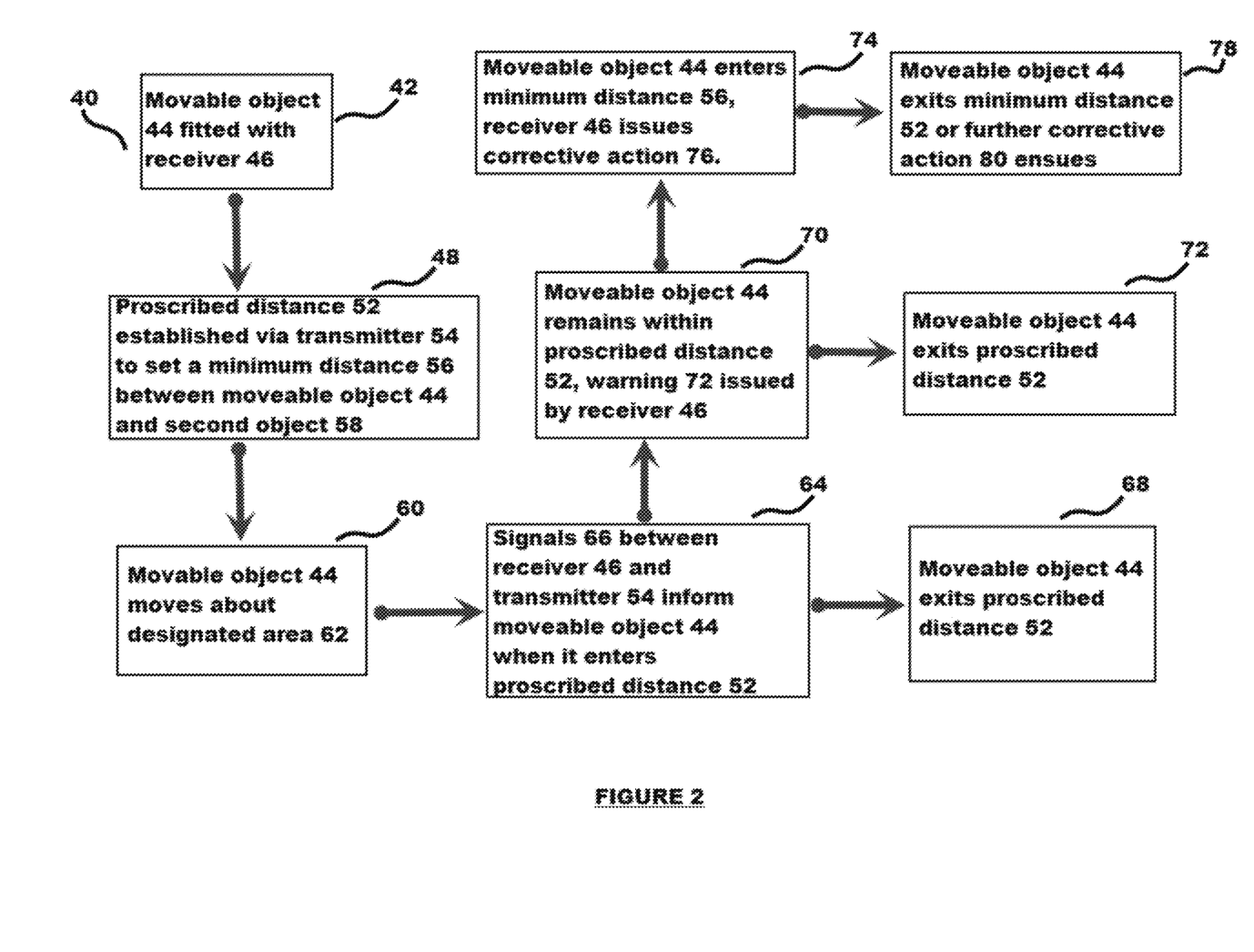
FIG. 2 shows a flow diagram of another embodiment of the current disclosure.

FIG. 2 shows a flow diagram of another use of distance separation system 40 used in the setting of a supply warehouse. At step 42, a movable object 44, such as a forklift, may be fitted with a receiver 46. At step 48, a proscribed distance 52 is established via transmitter 54 to keep movable object 44 at a certain minimum distance 56 from a second object 58. Second object 58 may be a movable object, such as another forklift, workers on the floor, or a static, non-moving location such as a work area, safety zone, office area, etc. Movable object 44, at step 60, proceeds to move about a designated area 62, such as a warehouse or merchandise floor. At step 64, based on signals 66 between receiver 46 and transmitter 54, moveable object 44 is informed when it enters proscribed distance 52. In this situation, proscribed distance 52 may be a certain distance in feet or meters from warehouse personnel, sensitive areas, other moveable objects, etc. At step 68, moveable object 44 exits proscribed distance 52. At step 70, if moveable object 44 remains within proscribed distance 52, warning 72 is issued by receiver 46. Warning 72 may be an auditory warning—such as a bell, whistle, chime, alarm, etc., or a verbal announcement informing the operator of moveable object 44 that they have entered proscribed distance 52. At step 72, moveable object 44 then exits proscribed distance 52. At step 74, moveable object 44 has remained in proscribed distance 52 and entered minimum distance 56, receiver 46 then issues corrective action 76. Corrective action 76 may include corrective measures such as fines for the operator, reduced power for moveable object 44 in order to slow or stop moveable object 44, warnings or reprimands added to the operator's personnel file, etc. At step 78, moveable object 44 exits minimum distance 52 or further corrective action 80 ensues. Further corrective action 80 may include shutting off moveable object 44, increased monetary fines, firing the operator, etc., in order to protect whatever object possesses transmitter 54. In a further embodiment, where a highly sensitive object or area is being protected, corrective measures 76 or 80 may occur immediately upon entering proscribed distance 52. The corrective actions may be employed singly or in groups. Indeed, in some embodiments, corrective action may be progressive where more and different types of corrective action are employed as a "violation" continues to occur. Indeed, multiple corrective actions may be applied simultaneously, such as warning sounds coupled with irritating audio frequencies, lights, stimuli, such as vibrations, shocks, etc. In an industrial setting, warning alarms could be couple with fines or could trigger notification events, such as sending a supervisor or controller a message that an infraction has occurred and is ongoing.

Figure 3:
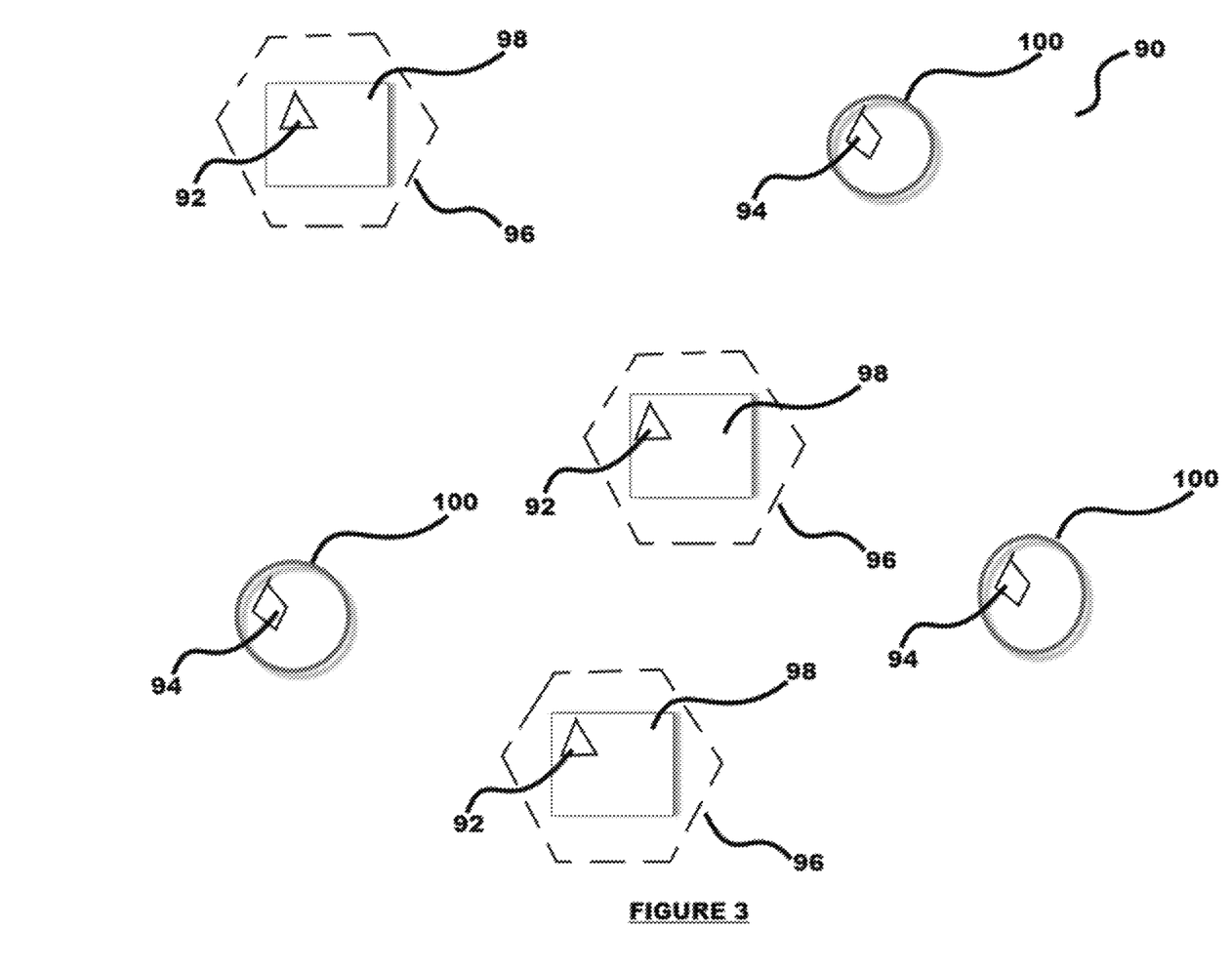
FIG. 3 shows a further embodiment of the current disclosure wherein multiple transmitters and multiple receivers keep a minimum distance between different objects.

FIG. 3 shows a further embodiment of the current disclosure, wherein system 90 uses multiple transmitters 92 and multiple receives 94 to keep a minimum distance 96 between first objects 98 and second objects 100. In this embodiment, both objects 98 and 100 may be moveable or first object 98 may be stationary while second object 100 is moveable.

In a further embodiment, distance sensing may be employed with the current disclosure. For purposes of example only, the distance system may be explained via an analogy. Suppose that you were departing from a home base station with three different walkie talkies, each with a different maximum range (transmitting power). The first has a maximum range of 1 mile. The second has a maximum range of 2 miles, and the third has a maximum range of 3 miles. Someone stays in the base station and talks continuously into all three walkie talkies at once while you set off away from the station. After a mile of walking, you notice that the first walkie talkie stops receiving—and you can thereby deduce that you about a mile away. After the second mile, the second walkie talkie also stops receiving, and you know that you are therefore about two miles away. After a third mile, the third walkie talkie cuts out and you know that you are at least about three miles away.

Figure 4:
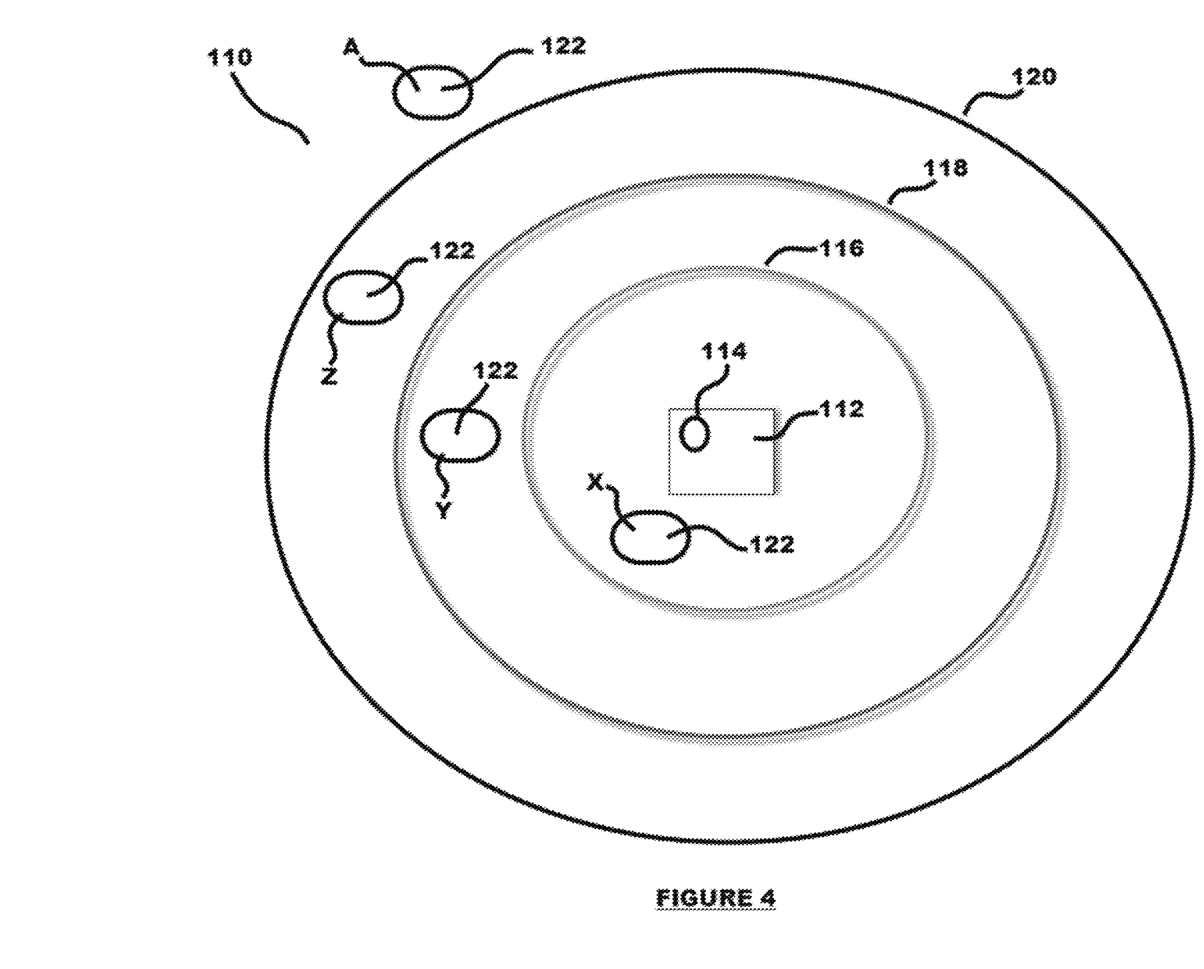
FIG. 4 illustrates a system wherein a base station contains a transmitter that can vary the power of its signals, such as sending out a first signal, a second signal and a third signal having different power levels from one another.

With respect to the current disclosure, as shown in FIG. 4, a system 110 may be established wherein a base station 112 contains a transmitter 114 that can vary the power of its signals, such as sending out a first signal 116, a second signal 118 and a third signal 120. The operator at base station 112 sets transmitter 114 to output first signal 116 at a power that should travel some predetermined distance, such as, for purposes of example only and not intended to be limiting, about 1 mile and the signal will identify itself as something like "This is the 1 mile range signal". Then transmitter 114 is set to output second signal 118 to a power that will travel for a different predetermined distance, such as 2 miles, and will identify itself as "This is the 2 mile range signal". Then transmitter 114 is set to output third signal 120 to the power level that should travel a further, different predetermined range, such as 3 miles, and the signal will identify itself as something along the lines of, "This is the 3 mile range signal". In one embodiment, the transmitter may emit bit sequences at varying powers. The power for the three signals is such that the 1-mile signal dies out first, and the 2-mile signal dies out next, etc. The first half of the bit sequence identifies the transmitter unit. The second half denotes the "distance". So while all three signals are received, one is within the first band. When only the second two signals are received, one is in the second band, etc.

One setting out from base station 112 with a receiver 122 could immediately pick up all three signals, 116, 118, 120 (while three signals are disclosed, more or less signals are considered within the scope of this disclosure such as 2, 4, 5, 6, 7, etc.) then one would know that, if she were receiving all three signals 116, 118 and 120 clearly, she is within 1 mile of the base station, as shown by receiver 122 at position X. When the user loses first signal 116, e.g., the 1-mile signal, but still receives second signal 118 and third signal 120, the 2 and 3 mile signals, respectively, then she would know that she was between 1 to 2 miles from the base station, as shown by position Y of receiver 122. When the only signal she receives is the 3-mile signal, third signal 120, then she knows she is between 2 to 3 miles from the station, as shown at position Z. When she does not do not receive any signals, then she knows she is more than 3 miles away from the base station, as shown by position A.

In a further embodiment, a type of digital protocol using a single byte may be applied to this invention. For purposes of example only, the digital protocol could be:

Header_Data 0 1 0 1 _ 0 0 0 1=Receiver 1 ft away from Transmitter 0101 (Power Level=1)

0 1 0 1 _ 0 0 1 1=Receiver 2 ft away from Transmitter 0101 (Power Level=2)

0 1 0 1 _ 0 1 1 1=Receiver 3 ft away from Transmitter 0101 (Power Level=3)

0 1 0 1 _ 1 1 1 1=Receiver 4 ft away from Transmitter 0101 (Power Level=4)

The preceding 4-bit header (in this case 0101) identifies transmitter 114 to receiver 122 (allowing receiver 122 to ignore certain other transmitters or respond differently in the proximity of different transmitters) and the remaining 4-bits indicate the power with which the signal, such as first signal 116, second signal 118, and third signal 120, was emitted, which, in theory, is the inverse square of the distance it is expected to travel.

Because wireless signals transmitted at the same power may travel different distances through different media, this system may not be as accurate as time-based distance measuring techniques (e.g., time-of-flight, radar, and GPS). However, it is ideally suited for approximating short distances in low-cost devices since ultra-precise time measurement would not be required and would significantly increase the cost and complexity of such a product.

Figure 5:
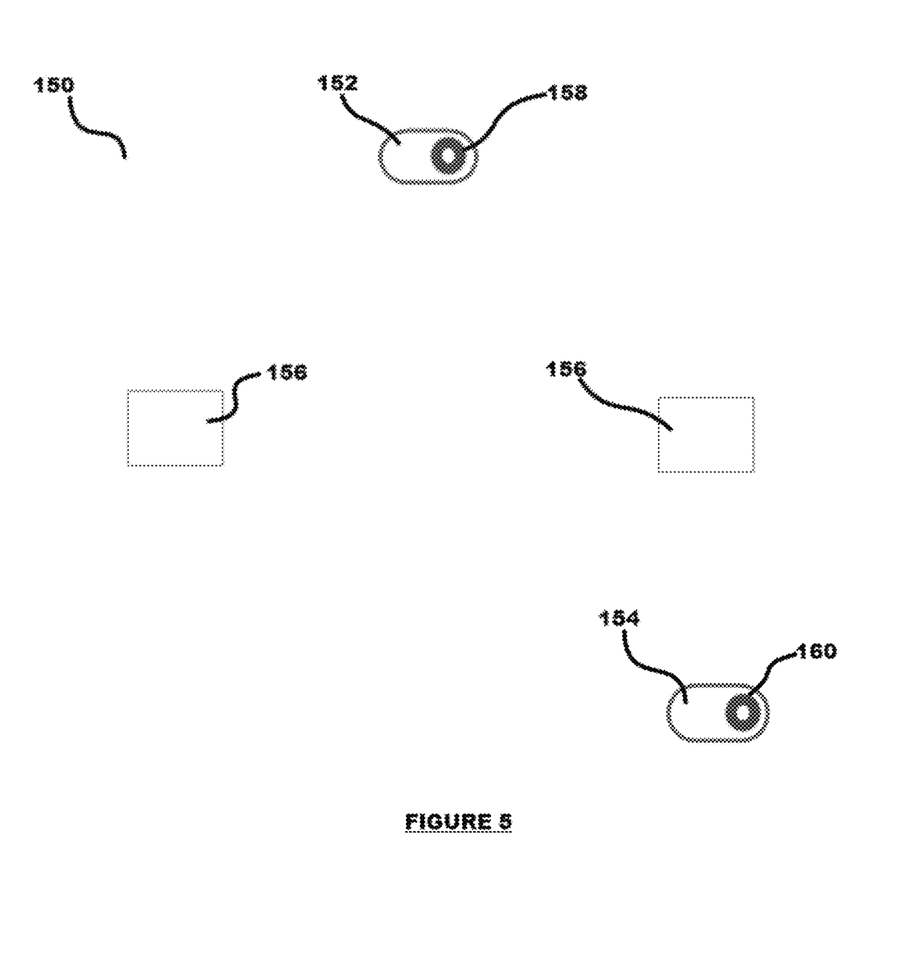
FIG. 5 shows a system to determine whether a first object or a second object moves toward the other object.

In a further embodiment, as shown in FIG. 5, a system 150 may be put in place to determine whether a first object 152 or second object 154 moves toward the other object. In one application, system 150 could be used to detect which of multiple pets was approaching the other pet(s) and only the intruding pet would be subject to corrective action. With respect to system 150, at least two stationary bases 156 may be employed to track the locations of multiple pets relative to the stationary bases 156 and one another. In this case, first object 152 may employ a first transmitter/receiver 158 and second object 154 a second transmitter/receiver 160 that interact with stationary bases 156 to track the positions of the objects with respect to one another as well as to determine if one objects moves toward or seeks out the other object. Then either transmitter/receiver 158 or 160 could administer appropriate corrective measures as disclosed herein to curb the errant behavior of the intruding object. In one embodiment, two transmitters interact with a position-monitoring base by emitting bit sequences at varying powers, but the header of the signal is different between the two transmitters so that the base can differentiate the signals. As the individual signals fade out, the base can know that the distance to transmitter X is now in band Y (1, 2, or 3).

The current disclosure employs a minimalistic/cost effective approach to developing its systems. Another way to track distance is by measuring the time of flight of light (or radio waves when walls and furniture are involved). For instance a 1 Ghz distance sensor may be employed to time events down to the nanosecond as light travels approximately one foot every nanosecond. Therefore, in theory, it should be possible to create a low-cost indoor GPS-style system that is capable of detecting the location of a transmitter to within around a foot in three dimensions (with at least 3 receiver base stations). In such a system, the transmitter would send a signal with the exact time of the initial transmission encoded into it. The receiver would then check the time immediately as it receives this signal, then read this signal's time information, and then calculate its distance (to within about a foot) based on the time the signal took to arrive.

Various modifications and variations of the described methods, pharmaceutical compositions, and kits of the disclosure will be apparent to those skilled in the art without departing from the scope and spirit of the disclosure. Although the disclosure has been described in connection with specific embodiments, it will be understood that it is capable of further modifications and that the disclosure as claimed should not be unduly limited to such specific embodiments. Indeed, various modifications of the described modes for carrying out the disclosure that are obvious to those skilled in the art are intended to be within the scope of the disclosure. This application is intended to cover any variations, uses, or adaptations of the disclosure following, in general, the principles of the disclosure and including such departures from the present disclosure come within known customary practice within the art to which the disclosure pertains and may be applied to the essential features herein before set forth.

What is claimed is:

1. A system for maintaining interobject separation comprising:
   at least one first proximity device affixed to a first object;
   wherein the first proximity device comprises a first transmitter/receiver;
   at least one second proximity device affixed to a second object;
   wherein the second proximity device comprises a second transmitter/receiver;
   wherein the at least one first proximity device receives at least one signal transmitted from the at least one second proximity device;
   wherein the at least one signal varies in intensity based on a distance between the first object and second object;
   wherein the at least one signal triggers at least one corrective measure when the first object and second object are within a predefined distance from one another; and
   wherein additional corrective measures are employed as time the first object and second object are in the predefined distance from one another increases.

2. The system of claim 1, wherein the signal has a protocol to eliminate false positive triggers.

3. The system of claim 1, wherein the first object and the second object are capable of movement independent of one another.

4. The system of claim 3, wherein the first and second object are animals.

5. The system of claim 1, wherein the first and second transmitter emits at least one continuous signal to the first and second receiver.

6. The system of claim 1, wherein the first and second transmitter send separate signals to the first and second receiver wherein each signal is distance encoded.

7. The system of claim 1, wherein multiple corrective measures are applied simultaneously once a determined time threshold is reached.

8. The system of claim 1, wherein at least one additional signal is employed to keep either the first or second object within a set distance of a third object.

9. The system of claim 1, wherein either the first or second object, but not both, receives the corrective action when the first and second object come within the predefined distance from one another.

10. A method for maintaining interobject separation comprising:
  affixing at least one first proximity device to a first object;
  wherein the first proximity device comprises a first transmitter/receiver;
  affixing at least one second proximity device to a second object;
  wherein the second proximity device comprises a second transmitter/receiver;
  configuring the at least one first proximity device to receive at least one signal transmitted from the at least one second proximity device;
  varying intensity of the at least one signal based on a distance between the first object and second object; and
  triggering, via the at least one signal, at least one corrective measure when the first object and second object are within a predefined distance from one another; and
  employing additional corrective measures as time the first object and second object are in the predefined distance from one another increases.

11. The method of claim 10, further comprising wherein the first object and the second object are capable of movement independent of one another.

12. The method of claim 10, further comprising wherein the first and second object are animals.

13. The method of claim 10, further comprising emitting via the first and second transmitter at least one continuous signal that is received by the first and second receiver.

14. The method of claim 10, further comprising sending separate signals, via the first and second transmitter, to the first and second receiver wherein each signal is distance encoded.

15. The method of claim 10, further comprising simultaneously applying multiple corrective measures once a determined time threshold is reached.

16. The method of claim 10, further comprising employing at least one additional signal to keep either the first or second object within a set distance of a third object.

17. The method of claim 10, further comprising receiving via the first or second object, but not both, the corrective action when the first and second object come within the predefined distance from one another.

18. The method of claim 10, wherein the signal has a protocol to eliminate false positive triggers.

* * * * *